US005897100A

United States Patent [19]

Napier et al.

[11] Patent Number: 5,897,100

[45] Date of Patent: Apr. 27, 1999

[54] APPARATUS FOR REMOVING AN ENGINE FROM A VAN

[76] Inventors: Corbett Napier; Sandy Napier, both of 3600 Mountain Rd., Pasadena, Md. 21122

[21] Appl. No.: 08/440,907

[22] Filed: May 15, 1995

[51] Int. Cl.[6] .......... B60P 1/48

[52] U.S. Cl. .......... 254/8 B; 254/124; 254/133; 254/134

[58] Field of Search .......... 414/917, 743; 254/8 B, 9 B, 10 B, 133, 134, DIG. 16, 124; 269/17, 47

[56] References Cited

U.S. PATENT DOCUMENTS

| | | | |
|---|---|---|---|
| 3,381,953 | 5/1968 | Miller | 269/17 |
| 4,118,010 | 10/1978 | Hanson | 254/134 |
| 4,479,632 | 10/1984 | McIntire et al. | 254/8 B |
| 4,705,264 | 11/1987 | Hawkins et al. | 269/17 |
| 5,033,717 | 7/1991 | Symon | 254/133 R |
| 5,251,875 | 10/1993 | Craychee et al. | 254/134 |

*Primary Examiner*—Robert C. Watson
*Attorney, Agent, or Firm*—Clifford A. Poff

[57] ABSTRACT

A mounting apparatus is used in combination with an engine crane to transport an internal combustion engine for servicing from the engine compartment of a van or similar vehicle. The mounting apparatus is rigidly secured to a free end of the boom of a mobile crane. A face plate is provided with openings for bolting to the engine using spacers to maintain a space relation between the face plate and the engine extending from the face plate towards the engine is a stabilizer arm to maintain a stable attitude of the engine during its movement to and from the engine compartment.

10 Claims, 4 Drawing Sheets

APPARATUS FOR REMOVING AN ENGINE FROM A VAN

BACKGROUND OF THE INVENTION

1. Field of the Invention

The present invention relates to an apparatus for joining an internal combustion engine with a means for transporting the engine from a van or similar vehicle to allow servicing of the engine at a site remote to the vehicle, and, more particularly, to such an apparatus to rigidly interconnect the engine with a crane of the type having a boom supported by a mobile base for movement about the floor or a work area.

2. Description of the Prior Art

It is well known in the art to use a wheeled crane having a boom that can be moved by a hydraulically actuated piston and cylinder assembly to lift an internal combustion engine from the engine compartment of passenger type vehicles. To accommodate the use of the crane, the hood of the vehicle is first removed and a lifting-pulling tool or an engine sling is joined to the engine after the engine mounts and hoses, cables and other structures have been disconnected from the engine to allow its removal. Thereupon, the engine, usually with the transmission intact, can be removed as a unit from the engine compartment. After the engine is serviced it can be replaced in the engine compartment by reversing the removal procedure. A problem, however, exists when it is necessary to service an internal combustion engine for a van and motor home of the type identified as Class A with a flat front end or Class C with a van front end. Such van or motor home vehicles are designed to place the engine beneath the cowl panel such that a forward portion of the engine projects forwardly of the cowl panel and is accessible from a small hoodlike covering when compared with the hood of a conventional passenger car. The rotational axis of the crank shaft is orientated parallel with the direction of movement of the vehicle along the highway and a rear portion of the engine projects partly into the passenger compartment where a covering is attached to the floor and the cowling to isolate and divide the engine compartment from the passenger compartment. A drive shaft extends rearwardly of the transmission at the rear end of the engine for supplying power to drive the rear wheels. A van of the type of this discussion is not a front wheel drive van where the engine is transversely mounted in the engine compartment in a way that the crankshaft rotates about an axis perpendicular to the movement of the van along a highway.

When it is necessary to remove the engine, a van orientated such that the crank shaft rotates about an axis parallel with the movement of the vehicle along the highway, it is not possible to gain sufficient clearance between the top of the engine and the cowl to allow access for the engine hoist boom in the past, it was necessary to disassemble components form the top of the engine to allow sufficient clearance for entrance of the boom between the cowling and the engine as well as clearance to allow lifting the engine free and clear from the engine mounts before extracting the engine from the engine compartment. Typically, the distance from the top of the engine to the cowl panel is approximately eight inches. Usually, twelve inches is necessary, which includes four inches of vertical space to lift the engine free and clear of the engine mounts; four inches to accommodate the height of the boom and at least an additional four inches to accommodate the aggregate height of the hook and chain connecting the boom to the engine. In the past, when it was necessary to remove the engine for servicing, it was necessary to partially disassemble the components which included the necessary removal of throttle body, intake manifold, alternator, power steering, air conditioning compressor, etc. (including the drive belt[s]). Of special significance is the fact that when the intake manifold is to be removed, there is a serious ever present danger of spilling of the coolant and/or oil on the carpet located in the passenger compartment of the van because the manifold can only be removed via the passenger compartment. When the manifold is unbolted and separated from the engine block, the coolant and oil cannot be removed from the manifold before the manifold is removed from the vehicle.

Accordingly, it is an object of the present invention to provide an improved apparatus to allow removal of an engine from a van or similar vehicle that will reduce the time and labor cost and allow the return of the engine to the engine compartment as a fully assembled unit ready for operation after reconnection of fluid supply and control lines.

SUMMARY OF THE INVENTION

In accordance with the present invention, there is provided an apparatus for use in combination with an engine crane to transport an internal combustion engine for servicing externally of operative mounting thereof in a van and similar vehicle of the type characterized by having mounting structure for the engine arranged to support the engine so that the rotational axis of the crank shaft is generally parallel with the direction of movement by the vehicle along a highway, the engine being accessible from both a hood structure externally of the vehicle and a cover situated in the passenger compartment the internal combustion engine further including a drive pulley on the crank shaft thereof and a flange protruding outwardly from the engine block for driving a fan blade, the apparatus including a face plate engaged for support by such a crane for movement horizontally in a plane generally parallel with the rotational axis of such a crank shaft, fastening means for rigidly interconnecting such an engine with the face plate, and a center support carried by the face plate for engaging the drive pulley of such an engine to control positioning of such an engine relative to the face plate.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
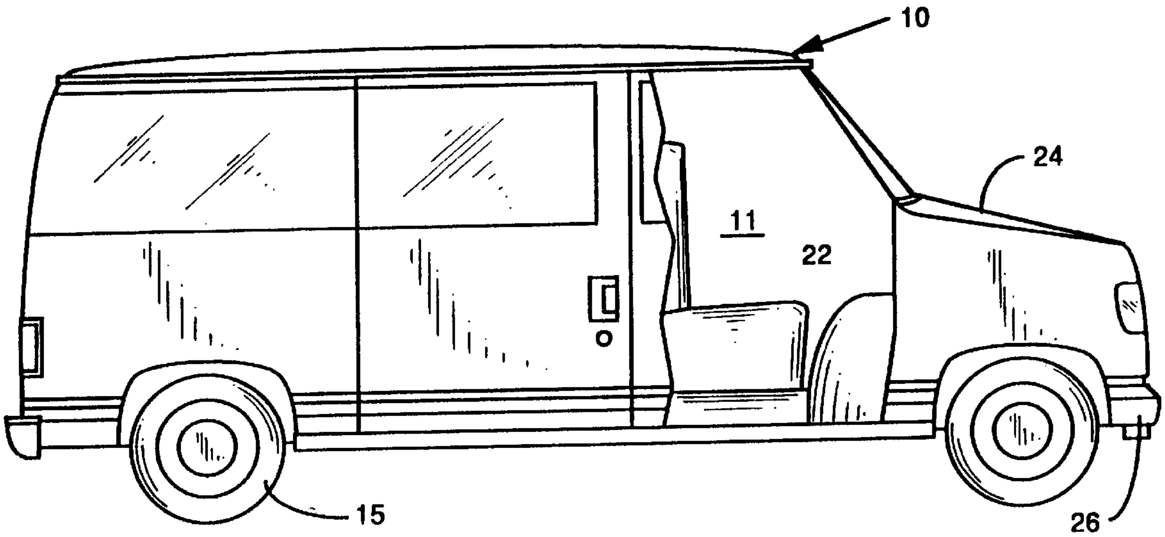
FIG. 1 is a side elevational view of a van of the type for which the present invention is useful for removal and replacement of an engine.
Figure 2:
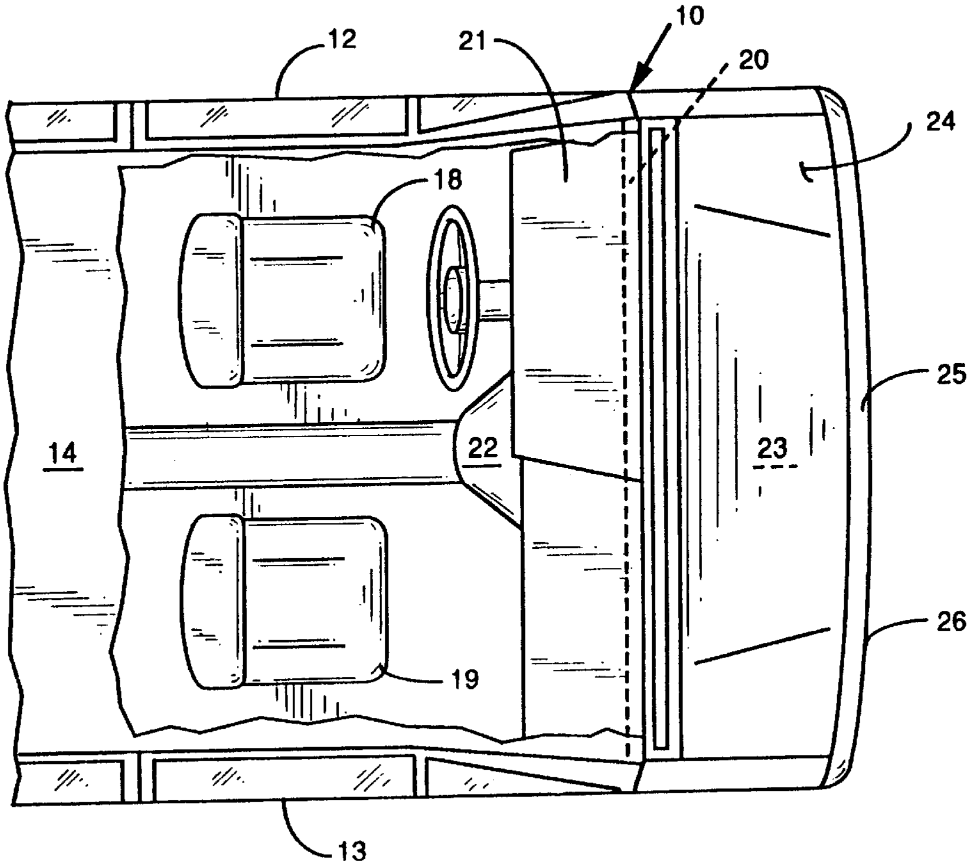
FIG. 2 is a plan view of the front portion of the van shown in FIG. 1.

As shown in FIGS. 1 and 2, a van 10 is shown well known in the art and having a passenger compartment 11 normally closed by doors 12 and 13 (FIG. 2) and rearwardly thereof there is a compartment 14 which may contain additional seating for other numerous structures. Normally rear wheels 15 are driven by the usual axles and drive shaft, not shown, extending forwardly along the central undercarriage to an output shaft on a transmission. The transmission is bolted to the rear side 16 of the engine 17 shown only in FIG. 4. In the passenger compartment 11, there is located seats 18 and 19 for the driver and passenger. Protruding from the cowling 20 which is situated beneath the dash 21 is a cover 22 that encloses and separates the passenger compartment 11 from the rear portion of an engine compartment 23. The forward portion of the engine compartment is normally enclosed by a hinged hood 24 that terminates at about a front grill assembly 25 that extends from the forward edge of the hood to a bumper 26.

Figure 3:
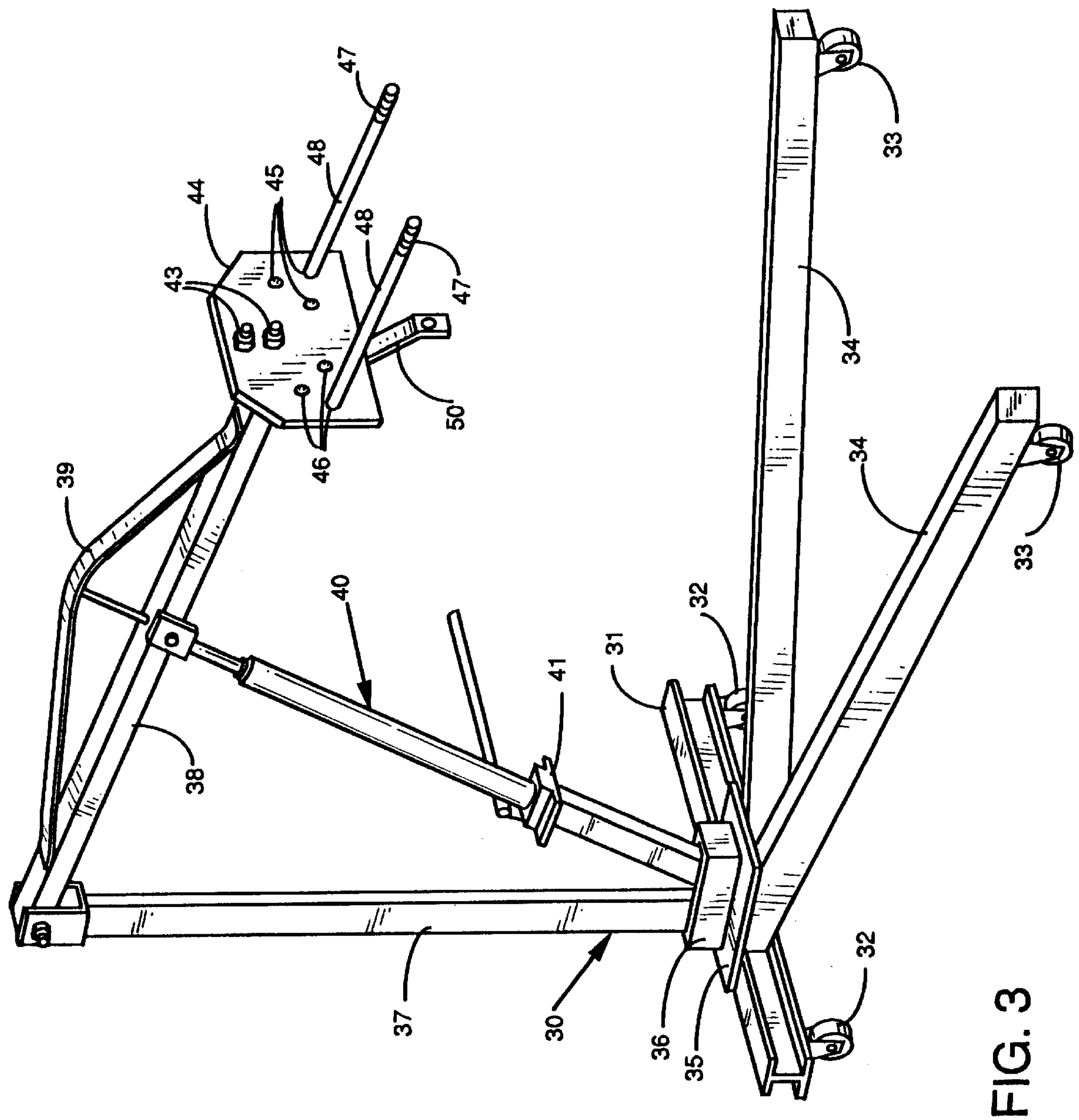
FIG. 3 is an isometric view illustrating one embodiment of apparatus mounted on an engine crane.
Figure 4:
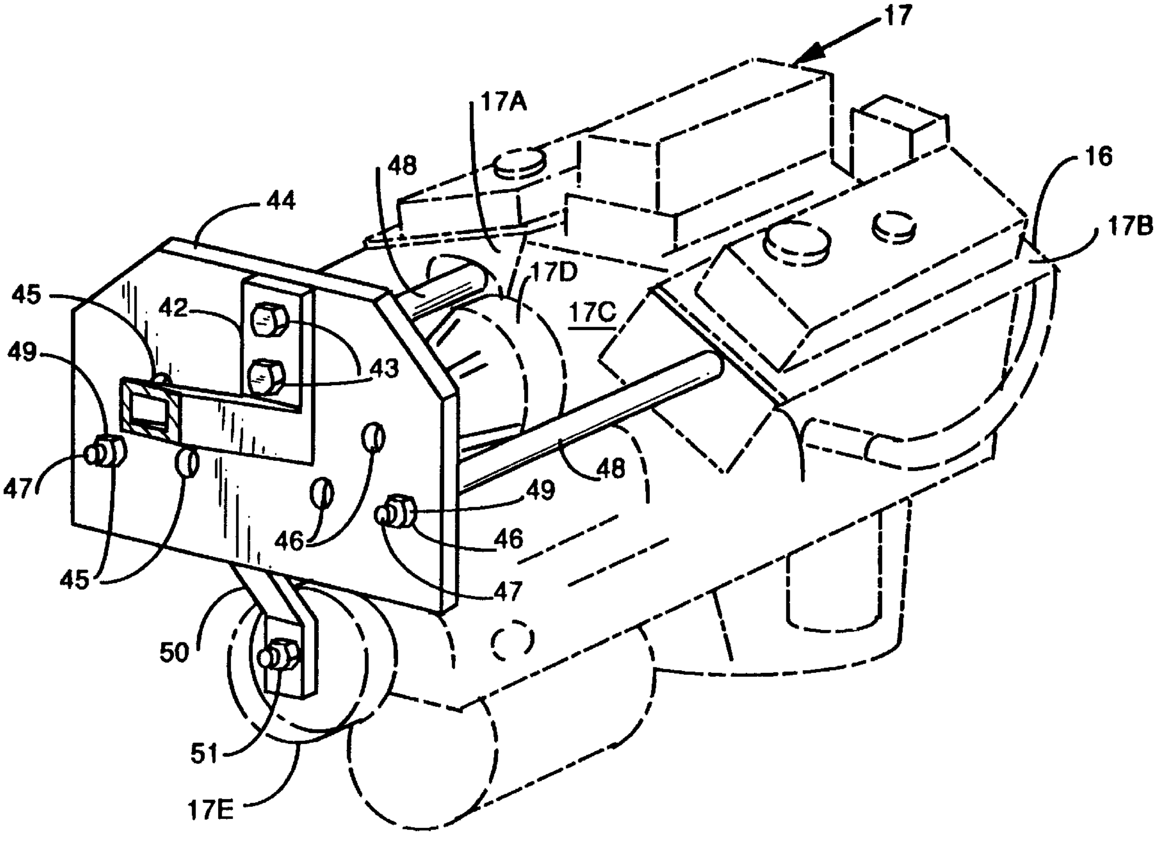
FIG. 4 is an isometric illustration of the apparatus secured to an engine.

Occasionally it is necessary to remove the engine 17 from vehicle 10 to carry out servicing operations such as for example, an overhauling of major internal engine components which cannot be accomplished with the engine remaining in its operative location in the vehicle. The service technician initially removes the cover 22, hinged hood, 24 and front grill assembly 25, and thereafter control, electrical and fluid lines are disconnected from the engine and the radiator is removed to expose the front end of the internal combustion engine 17. The engine mounts are then removed to unfasten the engine from the frame structure of the vehicle. A crane 30, according to the embodiment as shown in FIGS. 3 and 4, is used for supporting the engine during its removal from the engine compartment in a direction that is generally horizontal which is unlike conventional engine removal procedures in which the engine is lifted vertically from the engine compartment. The crane 30 can be selected from commercially available hydraulic cranes that are sold in the industry for lifting engines vertically from an engine compartment in conventional passenger car type automobiles.

The crane includes a rear support beam 31 supported on the ground by spaced apart wheel assemblies 32 and by a further set spaced apart wheel assemblies 33 joined to the forward protruding ends of diverging support legs 34. The support beam 31 and legs 34 are joined by a base plate 35 that in turn receives a mounting structure 36 for an upstanding support 37 having a clevis on its upper end for pivotally supporting one end of a boom 38. A truss 39 is used to strengthen the boom which is pivotally positioned by a piston and cylinder assembly 40 having its rod end clevis mounted to the boom as shown and the cylinder end supported by the fixture 36. A hand pump 41 can be operated by a service technician to deliver a pressurized hydraulic fluid to the piston and cylinder assembly. The forward end of the boom 38 is modified to include a rigidly attached mounting plate 42 through the use of vertically spaced apart fasteners 43. To maintain stability of the crane, the length of the boom must be shortened, if necessary, so as to terminate about 14 inches from a vertical plane containing wheels 33.

The mounting plate is welded or otherwise rigidly and securely affixed to the free end of the boom so as to sustain the weight of an engine assembly incident to removal and replacement in an engine compartment. The mounting plate is secured by fasteners 43 to a generally rectangularly shaped face plate 44 which is provided with two arrays 45 and 46 of fastener openings located at opposite lateral sides of the mounting plate 42. An opening of each array 45 and 46 is selected when the space comporting with the other opening of the array aligns with a drilled and tapped hole, made accessible by the workman, located in the engine head 17A and 17B. An elongated stud 47 is first threaded into the tapped hole and then an elongated metal tube 48 is passed over the stud to abut against the engine head whereupon the face plate is then positioned so that the free ends of the spaced apart studs can pass through the selected openings of the two arrays 45 and 46. A nut and washer 49 is then used to secure the face plate against the metal tube in an outwardly spaced relation from the engine block 17C as shown in FIG. 4. Protruding from the engine block between the tubes 48, there can be seen a housing structure 17D of a water pump.

The fan blade assembly is conveniently removed so that the mounting studs of the fan blade assembly, which are conventionally located in a flange protruding outwardly from the engine block, can abut against the confronting surface of the face plate 44 and thereby add stability to the engine during removal. A stabilizing arm 50 is affixed by welding or fastening to the face plate so that an outwardly extending arm portion can be connected by the fastener nut 51 normally used during operation of the engine to secure pulley 17E to an end of a crank shaft extending from the front end of the engine. By this combination of parts, the engine is not only stable but also rigidly supported on the end of the boom of the crane whereby operation of the manual pump 41 allows lifting movement of the engine from the engine mounts and then extraction form the engine compartment from the direction which is generally parallel with the rotational axis of the crank shaft.

Figure 5:
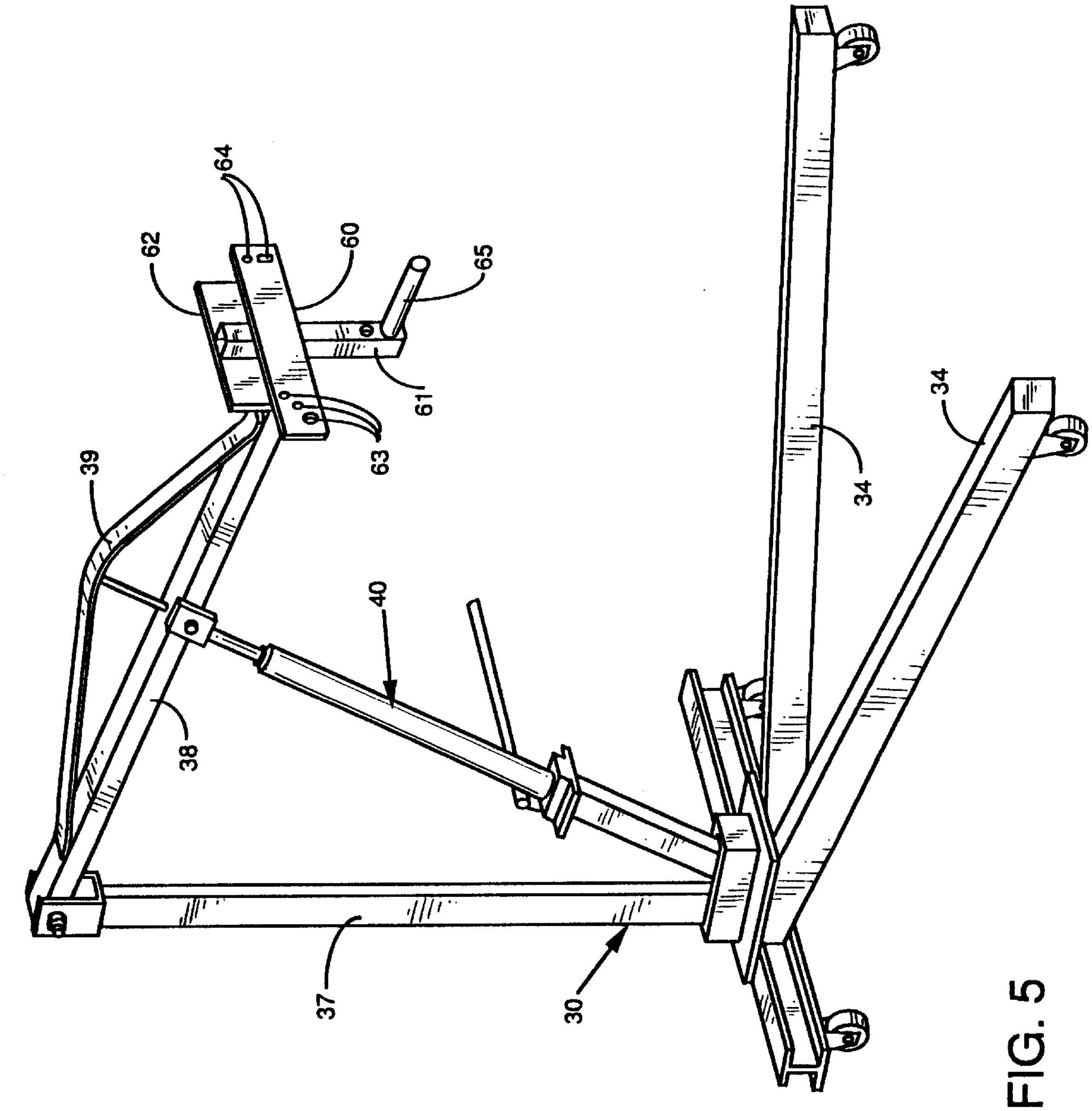
FIG. 5 is an isometric illustration similar to FIG. 3 and illustrating a second embodiment.

In the embodiment shown in FIG. 5, the face plate found in the embodiment of FIGS. 3 and 4 takes the form of a rectangular horizontally arranged bar 60 which is mounted by welding to a vertically extending stabilizer bar 61. The stabilizer bar is in turn welded to an attachment plate 62 that is joined with mounting plate 42 and the same manner as described previously in the embodiment of FIGS. 3 and 4. The crane structure in the embodiment of FIG. 5 is the same as previously described. The embodiment of FIG. 5 is specially constructed with arrays 63 and 64 of mounting holes. It can be seen that array 63 consists of holes that extend along a line of about 45 degrees to the extended length of bar 60 whereas the holes comprising array 64 are vertically spaced. The stabilizer bar 61 protrudes downwardly from box 60 where a spacer rod 65 is joined with the bar for extending outwardly for contact with an engine to serve the same function as stabilizer arm 50 according to the first embodiment. The hole patterns making up arrays 63 and 64 and the stabilizer bar 65 are particularly well suit for removing and replacing an engine produced by the Ford Motor Company whereas the embodiment of FIGS. 3 and 4 is well suited for removal and replacement of engines in vans produced by General Motors and Chrysler Corporations.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. Apparatus for use in combination with an engine crane to transport an internal combustion engine for servicing externally of operative mounting thereof in a van and similar vehicle of the type characterized by having mounting structure for the engine arranged to support the engine so that the rotational axis of the crank shaft is generally parallel with the direction of movement by the vehicle along a highway, the engine being accessible from both a hood structure externally of the vehicle and a cover situated in the passenger compartment the internal engine further including a drive pulley on the crank shaft thereof , said apparatus including:

a face plate rigidly and securely fastened to such a crane for movement horizontally in a plane generally parallel with the rotational axis of such a crank shaft;

fastening means for rigidly interconnecting such an engine with said face plate; and a center support carried by said face plate for engaging the drive pulley of such an engine to control positioning of such an engine relative to the face plate.

2. The apparatus according to claim 1 wherein said fastening means engage said face plate at preselected horizontally spaced locations at opposite lateral sides of said center support.

3. The apparatus according to claim 1 wherein said fastening means include threaded bolts each having a head portion engaged with said face plate and a threaded end portion threadedly engaged with the threads of a threaded hole in such an engine block.

4. The apparatus according to claim 3 wherein said fastening means further include spacer tubes interposed between said face plate and such an engine block for maintaining with said center support a stable load bearing interconnection between such an engine and such a crane during transport of the engine from such a vehicle.

5. The apparatus according to claim 3 wherein said face plate includes arrays of openings disposed at opposite lateral sides of said center support for receiving fastening means engageable with such threads of the threaded openings.

6. The apparatus according to claim 1 wherein said face plate defines a load bearing surface area for such an internal combustion engine.

7. The apparatus according to claim 1 wherein said center support engages said face plate and extends outwardly therefrom to engage with such an engine for support thereof.

8. The apparatus according to claim 1 wherein said crane further includes a mobile base having an upstanding support to pivotly carry said boom, and a jack for positioning said boom.

9. The apparatus according to claim 1 further including means for releasably securing said face plate to such a crane.

10. The apparatus according to claim 1 wherein said crane includes diverging support legs supported by wheels at their opposite ends, said legs being joined by a plate carrying an upstanding support for supporting one end of a boom having a length such that the terminal end of the boom extending from the upstanding support is spaced from a vertical plane containing said wheels on the outer most ends of the diverging support legs.

* * * * *